United States Patent
Hu et al.

(10) Patent No.: US 11,251,665 B2
(45) Date of Patent: Feb. 15, 2022

(54) MOTOR ROTOR AND PERMANENT MAGNET MOTOR

(71) Applicant: GREE ELECTRIC APPLIANCES, INC. OF ZHUHAI, Zhuhai (CN)

(72) Inventors: Yusheng Hu, Zhuhai (CN); Bin Chen, Zhuhai (CN); Bo Zhou, Zhuhai (CN); Min Wang, Zhuhai (CN); Yong Xiao, Zhuhai (CN)

(73) Assignee: GREE ELECTRIC APPLIANCES, INC. OF ZHUHAI, Zhuhai (CN)

( * ) Notice: Subject to any disclaimer, the term of this patent is extended or adjusted under 35 U.S.C. 154(b) by 67 days.

(21) Appl. No.: 16/755,122

(22) PCT Filed: Oct. 29, 2018

(86) PCT No.: PCT/CN2018/112311
§ 371 (c)(1),
(2) Date: Apr. 9, 2020

(87) PCT Pub. No.: WO2019/119972
PCT Pub. Date: Jun. 27, 2019

(65) Prior Publication Data
US 2020/0328638 A1    Oct. 15, 2020

(30) Foreign Application Priority Data

Dec. 21, 2017 (CN) .......................... 201711388513.4

(51) Int. Cl.
*H02K 1/27* (2006.01)
*H02K 1/276* (2022.01)
*H02K 3/487* (2006.01)

(52) U.S. Cl.
CPC ........... *H02K 1/2766* (2013.01); *H02K 3/487* (2013.01); *H02K 2201/03* (2013.01); *H02K 2213/03* (2013.01)

(58) Field of Classification Search
CPC .. H02K 1/2766; H02K 3/487; H02K 2201/03; H02K 2213/03
See application file for complete search history.

(56) References Cited

U.S. PATENT DOCUMENTS

2011/0133590 A1*   6/2011   Lokhandwalla ..... H02K 1/2766
                                                        310/156.53
2011/0278967 A1   11/2011   Utaka
(Continued)

FOREIGN PATENT DOCUMENTS

CN    103219814 A    7/2013
CN    104638863 A    5/2015
(Continued)

OTHER PUBLICATIONS

International Search Report of PCT/CN2018/112311.
Written Opinion of PCT/CN2018/112311.

*Primary Examiner* — Thomas Truong
(74) *Attorney, Agent, or Firm* — Dragon Sun Law Firm, PC; Jinggao Li, Esq.

(57) ABSTRACT

The present invention discloses a motor rotor and a permanent magnet motor. The motor rotor includes a rotor core and a plurality of magnetic poles provided in the rotor core, wherein each magnetic pole includes a first permanent magnet, a second permanent magnet and a third permanent magnet; the first permanent magnet being arranged on a central position of the magnetic pole on which said first permanent magnet is located, the second permanent magnet being arranged at two sides of the first permanent magnet, the third permanent magnet being arranged at one side of the second permanent magnet far away from the first permanent magnet; the coercivity of the first permanent magnet is smaller than that of the second permanent magnet and that (Continued)

of the third permanent magnet; and the third permanent magnet is arranged on a q axis of the motor.

18 Claims, 9 Drawing Sheets

(56) References Cited

U.S. PATENT DOCUMENTS

| | | | | |
|---|---|---|---|---|
| 2012/0091848 A1* | 4/2012 | Sakai | ............... | H02K 1/2766 310/156.43 |
| 2015/0115758 A1* | 4/2015 | Koka | ............... | B60L 50/51 310/156.07 |

FOREIGN PATENT DOCUMENTS

| | | |
|---|---|---|
| CN | 205385357 U | 7/2016 |
| CN | 107294243 A | 10/2017 |
| CN | 108023421 A | 5/2018 |
| CN | 207782523 U | 8/2018 |

* cited by examiner

MOTOR ROTOR AND PERMANENT MAGNET MOTOR

CROSS-REFERENCE TO RELATED APPLICATIONS

This application is a national stage application of PCT Application No. PCT/CN2018/112311. This Application claims priority from PCT Application No. PCT/CN2018/112311, filed Oct. 29, 2018, and CN Application No. 201711388513.4, filed Dec. 21, 2017, the contents of which are incorporated herein in the entirety by reference.

Some references, which may include patents, patent applications, and various publications, are cited and discussed in the description of the present disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

TECHNICAL FIELD

The present disclosure belongs to the technical field of motors, and particularly relates to a motor rotor and a permanent magnet motor.

BACKGROUND ART

According to the traditional permanent magnet motor, the magnetic flux is provided by a permanent magnet, but the magnetic field provided by the permanent magnet is fixed. Therefore, the internal magnetic field of the motor cannot be adjusted, and the efficiency of the permanent magnet motor at high frequency and low frequency cannot be assured simultaneously. Besides, given that the power supply has constant voltage, the highest operating frequency of the motor is limited. At present, most permanent magnet motors can only expand the operation range through flux weakening control, and when the motors are in the flux intensifying control, the operating efficiency of the motors will be reduced.

Therefore, a heretofore unaddressed need exists in the art to address the aforementioned deficiencies and inadequacies.

SUMMARY OF THE INVENTION

Therefore, the technical problem to be solved by the invention is to provide a motor rotor and a permanent magnet motor, which can effectively reduce the magnetizing and demagnetizing difficulty, increase the magnetizing range of the motor and improve the operating efficiency of the motor when the motor is subjected to a flux intensifying control.

In order to solve the above problems, the invention provides a motor rotor which comprises a rotor core and a plurality of magnetic poles provided in the rotor core, wherein the magnetic pole comprises a first permanent magnet, a second permanent magnet and a third permanent magnet, the first permanent magnet being arranged at a central position of the magnetic pole, the second permanent magnet being arranged at two sides of the first permanent magnet, the third permanent magnet being arranged at one side, far away from the first permanent magnet, of the second permanent magnet, the coercivity of the first permanent magnet being lower than the coercivity of the second permanent magnet and the coercivity of the third permanent magnet, and the third permanent magnet being arranged on a q axis of the motor.

Preferably, the third permanent magnet is itself symmetrical about the q axis of the motor on which the third permanent magnet is located.

Preferably, in a cross section of the rotor core, the first permanent magnet is rectangular, and the first permanent magnet is in a straight bar shape and arranged in the circumferential direction of the rotor core, the first permanent magnet being perpendicular to a d axis of the magnetic pole on which the first permanent magnet is located.

Preferably, both ends of the first permanent magnet are provided with a first flux barrier slot located at radial outer side of the second permanent magnet.

Preferably, an outer circle of the rotor core is provided with a groove corresponding to the first flux barrier slot, and the groove corresponds to the first flux barrier slot one to one.

Preferably, a radial depth of the groove is L1 and a thickness of a unilateral air gap of the motor is L, where $2L<L1<3L$.

Preferably, in the cross section of the rotor core, a connecting line connecting an end point of a radial inner side edge of the first permanent magnet and a center of the rotor core is a first connecting line, a connecting line connecting an end point on one side, close to the d axis of the motor, of a radial outer side edge of the groove and the center of the rotor core is a second connecting line, wherein the included angle between the second connecting line and the d axis of the motor is $\theta_1$, the included angle between the first connecting line and the d axis of the motor is $\theta_2$, where $\theta_1 \le \theta_2$.

Preferably, in the cross section of the rotor core, a straight line perpendicular to the d axis of the motor is a first straight line, the groove is trapezoidal, and a projection length of a connecting line connecting two end points of the groove located at a radial outer side on the first straight line is L4, a projection length of a connecting line connecting two end points of the groove located on a radial inner side on the first straight line is L3, and a projection length of a connecting line connecting a radial inner side end point, far away from the first permanent magnet, of the first flux barrier slot and a radial outer side end point, close to the first permanent magnet, of the first flux barrier slot on the first straight line is L2, where $0.8L3 \le L2 < L4$.

Preferably, a width of the second permanent magnet is H2, where $0.85H2 \le L2 \le H2$.

Preferably, the rotor core comprises a second mounting slot, the second permanent magnet is arranged in the second mounting slot, a flux bridge is arranged between the first flux barrier slot and the second mounting slot, in the cross section of the rotor core, a width of the flux bridge is L5, and a thickness of a unilateral air gap of the motor is L, where $L<L5$.

Preferably, a length of the radial inner side edge of the first flux barrier slot is L6, and a width of the second permanent magnet is H2, where $0.8H2 \le L6 \le 1.1H2$.

Preferably, an included angle $\theta_5$ between a side edge, close to the d axis of the motor, of the second mounting slot and the d axis of the motor satisfies $12° \le \theta_5 \le 21°$.

Preferably, the rotor core further comprises a second flux barrier slot extending from an end, close to the first flux barrier slot, of the second mounting slot toward the d axis of the motor.

Preferably, the rotor core further comprises a third flux barrier slot and a first mounting slot, the first permanent magnet being arranged in the first mounting slot, the third flux barrier slot being located on radial inner side of the first mounting slot and being arranged on the d axis of the motor, wherein the third flux barrier slot is positioned between two second flux barrier slots.

Preferably, in the cross section of the rotor core, a distance between a side edge on one side, close to the third flux barrier slot, of the second flux barrier slot and a circumferential side edge of the first permanent magnet on one side where the second flux barrier slot is located is H4, a distance between a side edge on one side, close to the third flux barrier slot, of the second flux barrier slot and a side edge on one side, close to the second flux barrier slot, of the third flux barrier slot is H5, a distance between a radial outer side edge of the third flux barrier slot and a radial inner side edge of the first mounting slot is H6, a distance between a radial inner side edge of the third flux barrier slot and a radial inner side edge of the first mounting slot is H7, a length of the first permanent magnet is L11, and a width of the first permanent magnet is H1, where $0.3L11 \leq H4 \leq 0.4L11$, $L \leq H5 \leq 2L$, and $H7 \leq H6 \leq 0.3H1$.

Preferably, the third flux barrier slot is a U-shaped slot; or the third flux barrier slot includes two rectangular slots which are symmetrical about the d axis of the motor.

Preferably, in the cross section of the rotor core, the rotor core further comprises a first mounting slot in which the first permanent magnet is mounted and a third mounting slot in which the third permanent magnet is mounted, the rotor core comprises an eccentric section eccentrically arranged relative to a center of the rotor core, an eccentric distance is L9, a distance between a radial outer side edge of the first mounting slot and an outer circle of the rotor is L10, where $L9 \leq 0.8L10$; and/or the rotor core further comprises a first V-shaped groove and a second V-shaped groove arranged on an outer circle of the rotor, wherein the first V-shaped groove and the second V-shaped groove are respectively arranged at two circumferential sides of the third mounting slot and are connected through a straight cutting edge; a distance between a radial outer end point on one side, close to the first V-shaped groove, of the third mounting slot and a side edge, close to the third mounting slot, of the first V-shaped groove being L7, a distance between the straight cutting edge and a radial outer side edge of the third mounting slot being L8, where $L8 \leq L7 \leq 1.2L8$; a central angle of the eccentric section being $2\theta3$, an included angle between a connecting line connecting a vertex on one side, close to the first permanent magnet, of the first V-shaped groove and the center of the rotor core and the d axis of the motor being $\theta4$, and a mechanical angle of each magnetic pole of the motor rotor being $2\theta$; where $0.3\theta \leq \theta3 \leq 0.4\theta$, and $0.8\theta \leq \theta4 \leq 0.9\theta$.

Preferably, when the rotor core comprises the first mounting slot, the radial outer side edge of the first flux barrier slot comprises a first oblique edge and a first protrusion connected in sequence in a direction close to the d axis of the motor in the cross section of the rotor core, the first protrusion protruding outwardly in a direction of the d axis of the motor, a distance between a connection point connecting the first oblique edge and the first protrusion and the radial outer side edge of the first mounting slot in a direction of the d axis of the motor being H10, on a straight line perpendicular to the d axis of the motor, a projection length of the first oblique edge being H9, a projection length of the first protrusion being H8, and a thickness of a unilateral air gap of the motor being L; where $H9=2H8$, and $0 \leq H10 \leq L$.

Preferably, two first flux barrier slots at both ends of the first permanent magnet are asymmetrically configured with respect to the d axis of the motor in a rotation direction of the motor rotor.

According to another aspect of the present disclosure, there is provided a permanent magnet motor comprising a motor rotor as described above.

The motor rotor provided by the invention comprises a rotor core and a plurality of magnetic poles provided in the rotor core, wherein the magnetic pole comprises a first permanent magnet, a second permanent magnet and a third permanent magnet, the first permanent magnet being arranged at a central position of the magnetic pole where the first permanent magnet is located, the second permanent magnet being arranged at two sides of the first permanent magnet, the third permanent magnet being arranged at one side, far away from the first permanent magnet, of the second permanent magnet, and the coercivity of the first permanent magnet being lower than that of the second permanent magnet and the third permanent magnet, the third permanent magnet being arranged on the q axis of the motor. According to the motor rotor, when the motor operates, the magnetic steel with low coercivity always operates in a flux intensifying state, the problem of magnetic flux change does not occur. Since the first permanent magnet with low coercivity is located at the center of the magnetic pole where the first permanent magnet is located, the magnetization and demagnetization difficulty of the motor can be reduced, the magnetization and demagnetization current of the permanent magnet with low coercivity is greatly reduced, and the magnetic stability of the permanent magnet with low coercivity in the rotor during normal operation is improved. Since the third permanent magnet is arranged on the q axis of the motor, the reluctance on the q axis of the motor can be increased, the inductance Ld>Lq is guaranteed, and the operating efficiency of the motor is optimal under the flux intensifying state.

BRIEF DESCRIPTION OF THE DRAWINGS

The accompanying drawings illustrate one or more embodiments of the present disclosure and, together with the written description, serve to explain the principles of the invention. Wherever possible, the same reference numbers are used throughout the drawings to refer to the same or like elements of an embodiment.

REFERENCE NUMERALS

Figure 1:
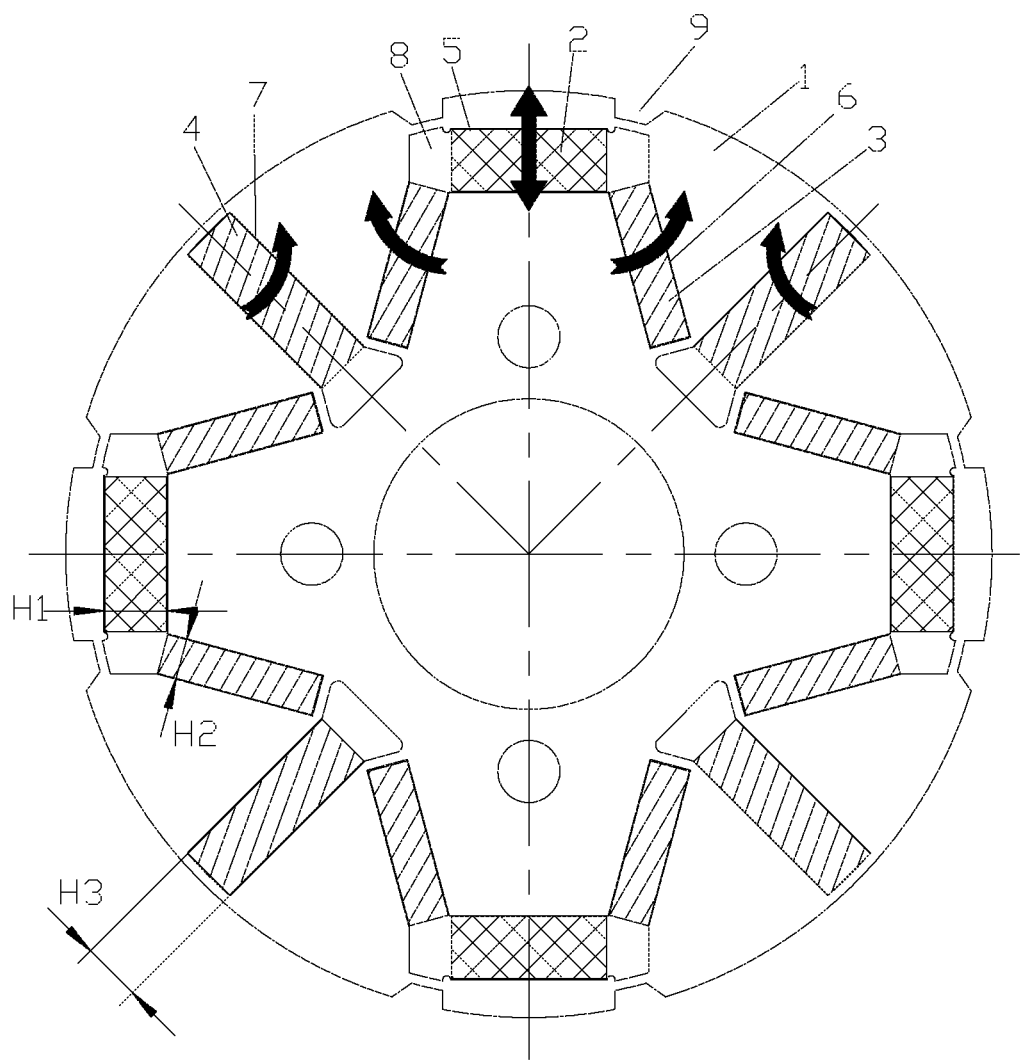
FIG. 1 is a schematic structural view of a motor rotor according to a first embodiment of the present disclosure.
Figure 2:
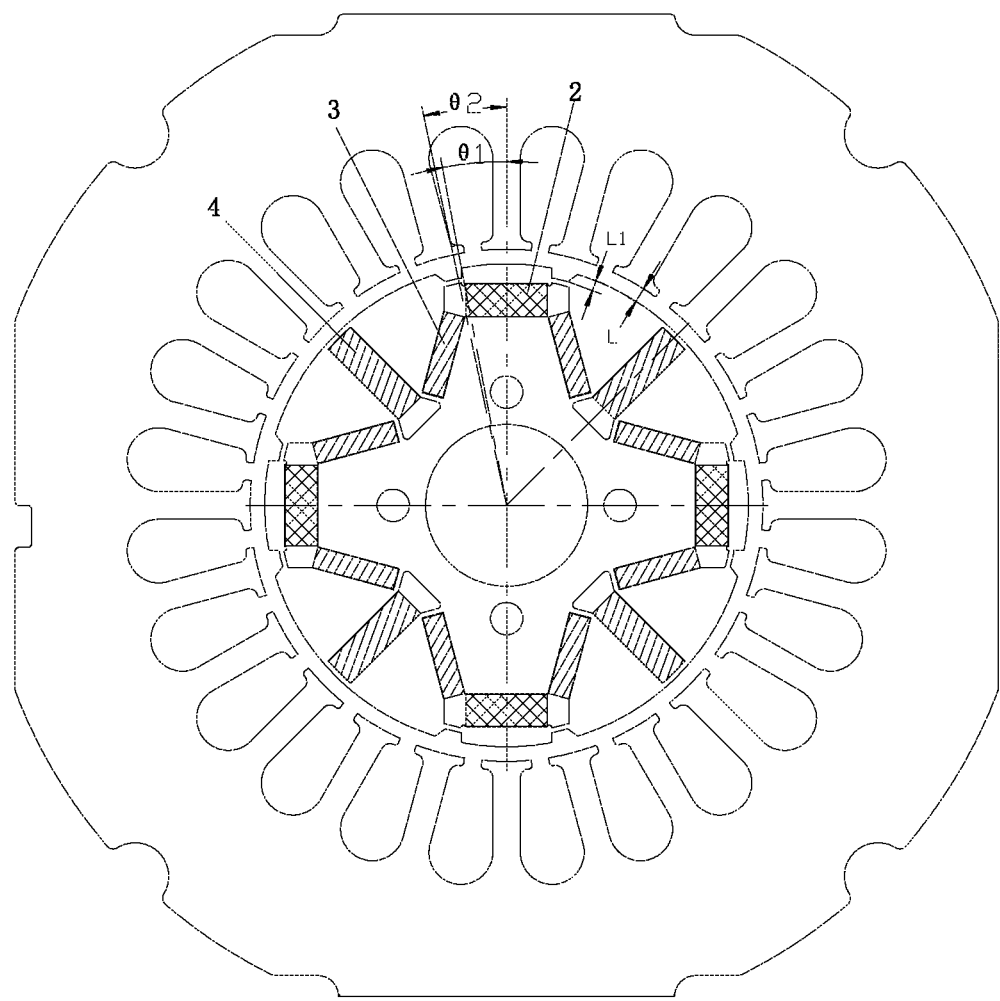
FIG. 2 is a first dimensional structural view of a motor rotor according to a first embodiment of the present disclosure.
Figure 3:
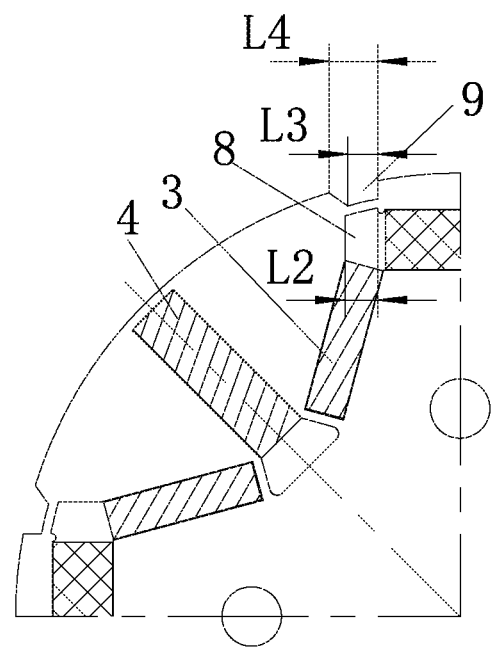
FIG. 3 is a second dimensional structural view of a motor rotor according to a first embodiment of the present disclosure.
Figure 4:
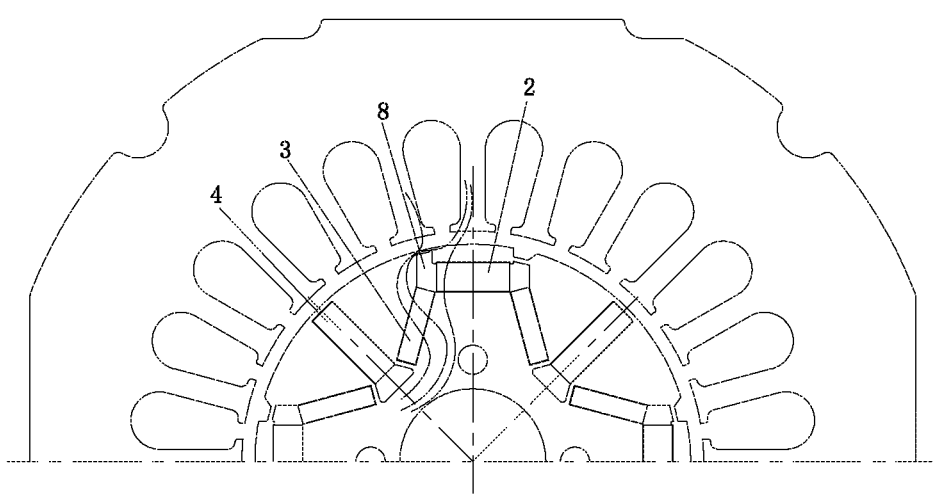
FIG. 4 is a schematic view showing a magnetic line when the motor rotor of the first embodiment of the present disclosure is not provided with a groove.
Figure 5:
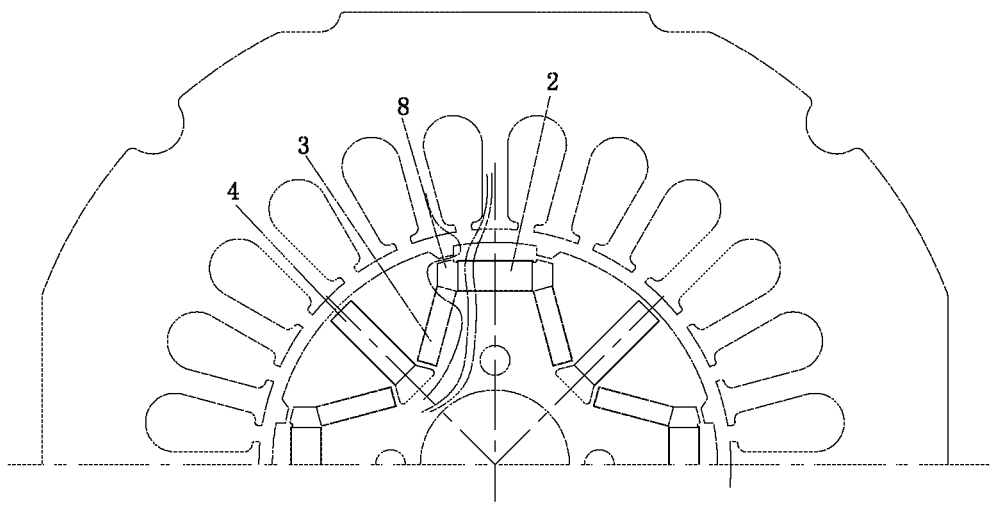
FIG. 5 is a schematic view showing a magnetic line when the motor rotor of the first embodiment of the present disclosure is provided with a groove.

1, rotor core; 2, first permanent magnet; 3, second permanent magnet; 4, third permanent magnet; 5, first mounting slot; 6, second mounting slot; 7, third mounting slot; 8, first flux barrier slot; 9, groove; 10, flux bridge; 11, second flux barrier slot; 12, third flux barrier slot; 13, first V-shaped groove; 14, second V-shaped groove; 15, straight cutting edge; 16, eccentric section; 17, first oblique edge; 18, first protrusion.

DETAILED DESCRIPTION OF THE EMBODIMENTS

The present disclosure will now be described more fully hereinafter with reference to the accompanying drawings, in which exemplary embodiments of the present disclosure are shown. The present disclosure may, however, be embodied in many different forms and should not be construed as limited to the embodiments set forth herein. Rather, these embodiments are provided so that this disclosure is thorough and complete, and will fully convey the scope of the invention to those skilled in the art. Like reference numerals refer to like elements throughout.

Referring to FIGS. 1 to 12 in combination, according to an embodiment of the present disclosure, a motor rotor comprises a rotor core 1 and a plurality of magnetic poles provided in the rotor core 1, wherein the magnetic pole comprises a first permanent magnet 2, second permanent magnets 3 and third permanent magnets 4, the first permanent magnet 2 being arranged at a central position of the magnetic pole where it is located, the second permanent magnets 3 being arranged at two sides of the first permanent magnet 2, the third permanent magnet 4 being arranged at one side, far away from the first permanent magnet 2, of the second permanent magnet 3, the coercivity of the first permanent magnet 2 being lower than the coercivity of the second permanent magnet 3 and the coercivity of the third permanent magnet 4, and the third permanent magnet 4 being arranged on a q axis of the motor.

According to the motor rotor, when the motor operates, the motor control strategy adopts a flux intensifying control, magnetic steel with low coercivity always operates in a magnetism maintaining state, the first permanent magnet 2 is maintained in the current magnetic flux state, so that the problem of magnetic flux change does not occur. The first permanent magnet 2 with low coercivity is located at the magnetic pole central position of the magnetic pole where the first permanent magnet 2 is located, and the second permanent magnets 3 and the third permanent magnets 4 with high coercivity are arranged at two sides of the first permanent magnet 2. Therefore, the magnetizing and demagnetizing difficulty of the motor can be reduced, and the magnetizing and demagnetization current of the permanent magnet with lower coercivity can be greatly reduced. Since the magnitude and direction of the magnetic field of the first permanent magnet 2 can be changed as required, and the magnitude and direction of the magnetic fields of the second permanent magnet 3 and the third permanent magnet 4 cannot be changed simultaneously, the rotor magnetic field can be maintained in a required state as required, and the stability of the rotor magnetic field can be guaranteed. Due to the fact that the third permanent magnet 4 is arranged on the q axis of the motor, the magnetic resistance of the q axis of the motor can be increased, the inductance Ld>Lq is guaranteed, and the operating efficiency of the motor is optimal under the flux intensifying control state.

Preferably, the third permanent magnet 4 is itself symmetrical about the q axis of the motor on which it is located. Therefore, the distribution of the magnetic resistance of the q axis in adjacent magnetic poles can be uniform, the distribution of magnetic force lines in the motor is uniform, and the operating efficiency and the operating stability of the motor are effectively improved.

Preferably, the first permanent magnet 2 is rectangular and in the cross section of the rotor core 1, and the first permanent magnet 2 is in a straight bar shape and arranged in a circumferential direction of the rotor core, the first permanent magnet 2 being perpendicular to a d axis of the magnetic pole on which the first permanent magnet 2 is located. In this way, the structural design of the first permanent magnet 2 can be more reasonable, the volume occupation of the first permanent magnet 2 in the radial direction of the rotor is reduced, and the use amount of the permanent magnet of the second permanent magnets 3 with higher coercivity is increased. The torque and the power density of the motor are improved, the magnetizing and demagnetization current of the motor when the magnetic field is adjusted is effectively reduced, the magnetizing and demagnetizing difficulty of the motor is reduced, and the real-time synchronous adjustment of the internal magnetic field of the motor is realized.

Referring to FIGS. 1 to 5 in combination, according to a first embodiment of the present disclosure, both ends of the first permanent magnet 2 are provided with a first flux barrier slot 8 located at radial outer side of the second permanent magnet 3. The first flux barrier slots 8 are arranged at the both ends of the first permanent magnet 2 along the circumferential direction, so that the difficulty of magnetizing and demagnetizing the magnetic steel during magnetic modulation can be reduced, the magnitude of magnetizing and demagnetization current of the motor during magnetic modulation can be reduced. Therefore, the problem that demagnetizing is likely to occur when the permanent magnet with low coercivity is influenced by the permanent magnet with high coercivity is avoided or reduced. The flux adjustment range of the motor is increased, the magnetic stability of the permanent magnet with low coercivity in the rotor during normal operation is improved, and the power required for the motor operation is reduced.

Preferably, an outer circle of the rotor core 1 is provided with a groove 9 corresponding to the first flux barrier slot 8, and the groove 9 corresponds to the first flux barrier slot 8 one to one. A first flux barrier slot 8 is arranged at two circumferential ends of the first permanent magnet 2, and a groove 9 is arranged on the outer circle of the rotor core 1 corresponding to the radial position of the first flux barrier slot 8. In this way, the arrangement of magnetic lines can be forcibly changed through the cooperation of the first flux barrier slot 8 and the groove 9, so that more magnetic lines are used for changing the magnetism of the first permanent magnet 2, and the magnetizing and demagnetizing difficulty of the motor is improved.

Preferably, a radial depth of the groove 9 is L1 and a thickness of a unilateral air gap of the motor is L, where 2L<L1<3L.

Preferably, in the cross section of the rotor core 1, the connecting line between the end point of the stator tooth and the center of the rotor core 1 is a first connecting line, the connecting line between the end point on the side, close to the d axis of the motor, of the radial outer side edge of the groove 9 and the center of the rotor core 1 is a second connecting line, and the included angle between the second connecting line and the d axis of the motor is θ1, while the included angle between the first connecting line and the d axis of the motor is θ2, where θ1≤θ2≤30°/p, wherein p is the number of poles of the motor. By adopting the design, sufficient magnetizing and demagnetizing energy can be guaranteed, and, meanwhile, the operating efficiency of the motor can be guaranteed.

Preferably, in the cross section of the rotor core 1, a straight line perpendicular to the d axis of the motor is a first straight line, and the groove 9 is trapezoidal. A projection length of a connecting line connecting two end points of the groove 9 located at a radial outer side on the first straight line is L4, a projection length of a connecting line connecting two end points of the groove 9 located on a radial inner side on the first straight line is L3, and a projection length of a connecting line connecting a radial inner side end point, far away from the first permanent magnet 2, of the first flux barrier slot 8 and a radial outer side end point, close to the first permanent magnet 2, of the first flux barrier slot 8 on the first straight line is L2, where 0.8L3≤L2<L4.

Preferably, a width of the second permanent magnet 3 is H2, where 0.85H2≤L2≤H2. H3 in the drawings is a width of the third permanent magnet 4.

By adding the groove 9 and limiting the specific structure of the groove 9 according to parameters such as the thickness L of the unilateral air gap of the motor, the magnetic separation structure is optimized, and the magnetization current is further reduced.

Figure 6:
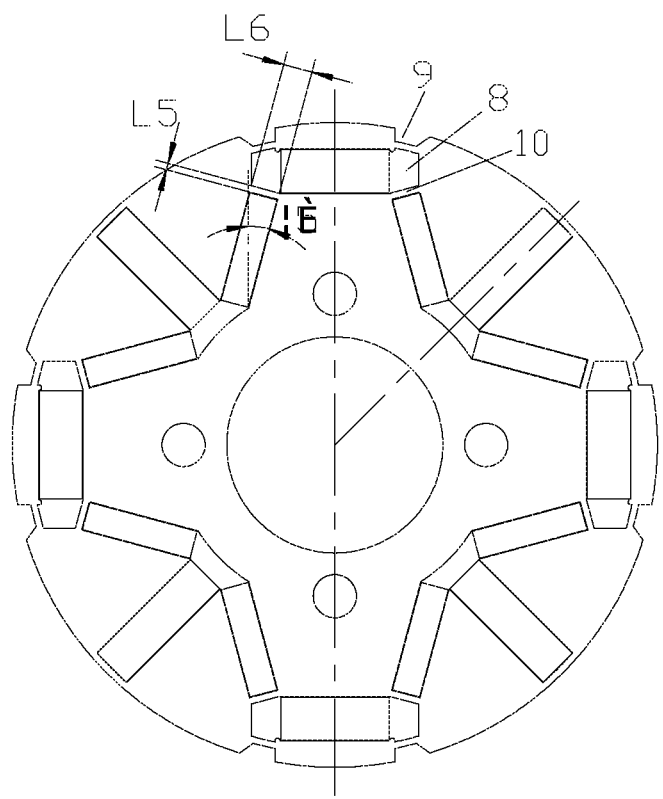
FIG. 6 is a schematic structural view of a motor rotor according to a second embodiment of the present disclosure.
Figure 7:
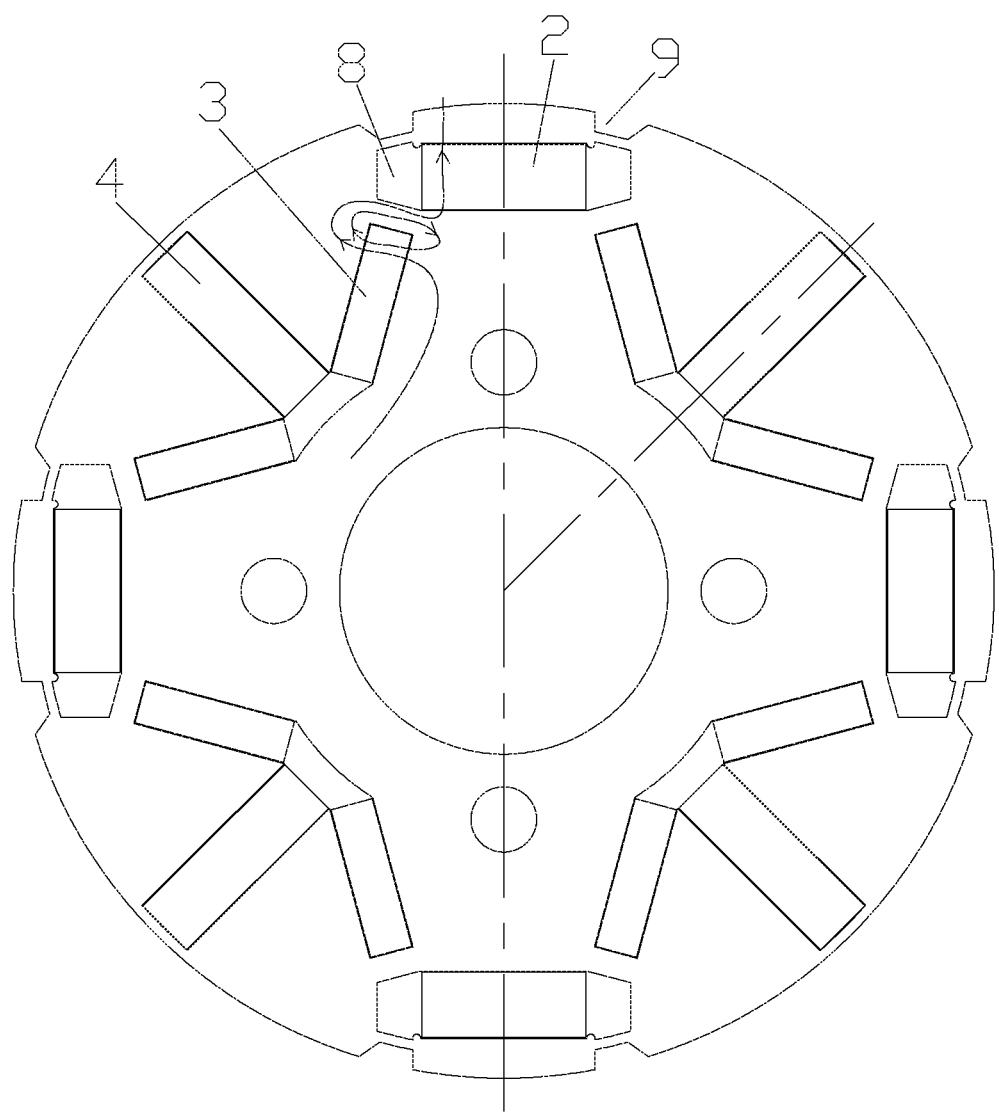
FIG. 7 is a schematic view showing a magnetic line of the motor rotor according to a second embodiment of the present disclosure.

Referring to FIGS. 6 and 7 in combination, according to a second embodiment of the present disclosure, a rotor core 1 includes a second mounting slot 6, second permanent magnet 3 is arranged in the second mounting slot 6, and a flux bridge 10 is provided between the first flux barrier slot 8 and the second mounting slot 6. In the cross section of the rotor core 1, the width of the flux bridge 10 is L5, and the thickness of a unilateral air gap of the motor is L, where L<L5.

Under the normal state of the variable flux motor, the magnetism of the second permanent magnet 3 and third permanent magnet 4 with higher coercivity will press the magnetism of the first permanent magnet 2 with lower coercivity, so that the second permanent magnet 3 and third permanent magnet 4 with higher coercivity have a demagnetization effect on the first permanent magnet 2 with lower coercivity. In normal state, the first permanent magnet 2 with lower coercivity has a risk of demagnetization. Meanwhile, during the magnetizing process in the driving process, the two magnetic steels are in a parallel connection state, and the second permanent magnet 3 and the third permanent magnet 4 with higher coercivity can short-circuit most magnetizing energy, so that magnetization current is increased, controller pressure is increased, and cost is increased; by adopting the flux bridge 10 at the position shown in FIG. 5, the permanent magnet with the higher coercivity and the permanent magnet with the lower coercivity can be connected in series, namely the permanent magnet with the higher coercivity has a magnetic retention effect on the permanent magnet with the lower coercivity. When magnetization is carried out, the magnetization current has an effect on the permanent magnet with lower coercivity, and the permanent magnet with higher coercivity also has an effect on the permanent magnet with lower coercivity. The demagnetization current can be effectively improved by the same principle, and the demagnetization risk in normal operation is reduced.

Preferably, a length of the radial inner side edge of the first flux barrier slot 8 is L6, a width of the second permanent magnet 3 is H2, where 0.8H2≤L6≤1.1H2.

Preferably, angle θ5 between a side edge, close to the d axis of the motor, of the second mounting slot 6 and the d axis of the motor satisfies 12°≤θ5≤21°. By arranging the flux bridge 10, limiting the thickness of the flux bridge 10 according to the thickness L of the unilateral air gap of the motor, limiting the size relationship between the first flux barrier slot 8 and the second permanent magnet 3 and the like, the position arrangement of the flux bridge 10 can be more reasonable, and the magnetization current can be effectively improved.

Figure 8:
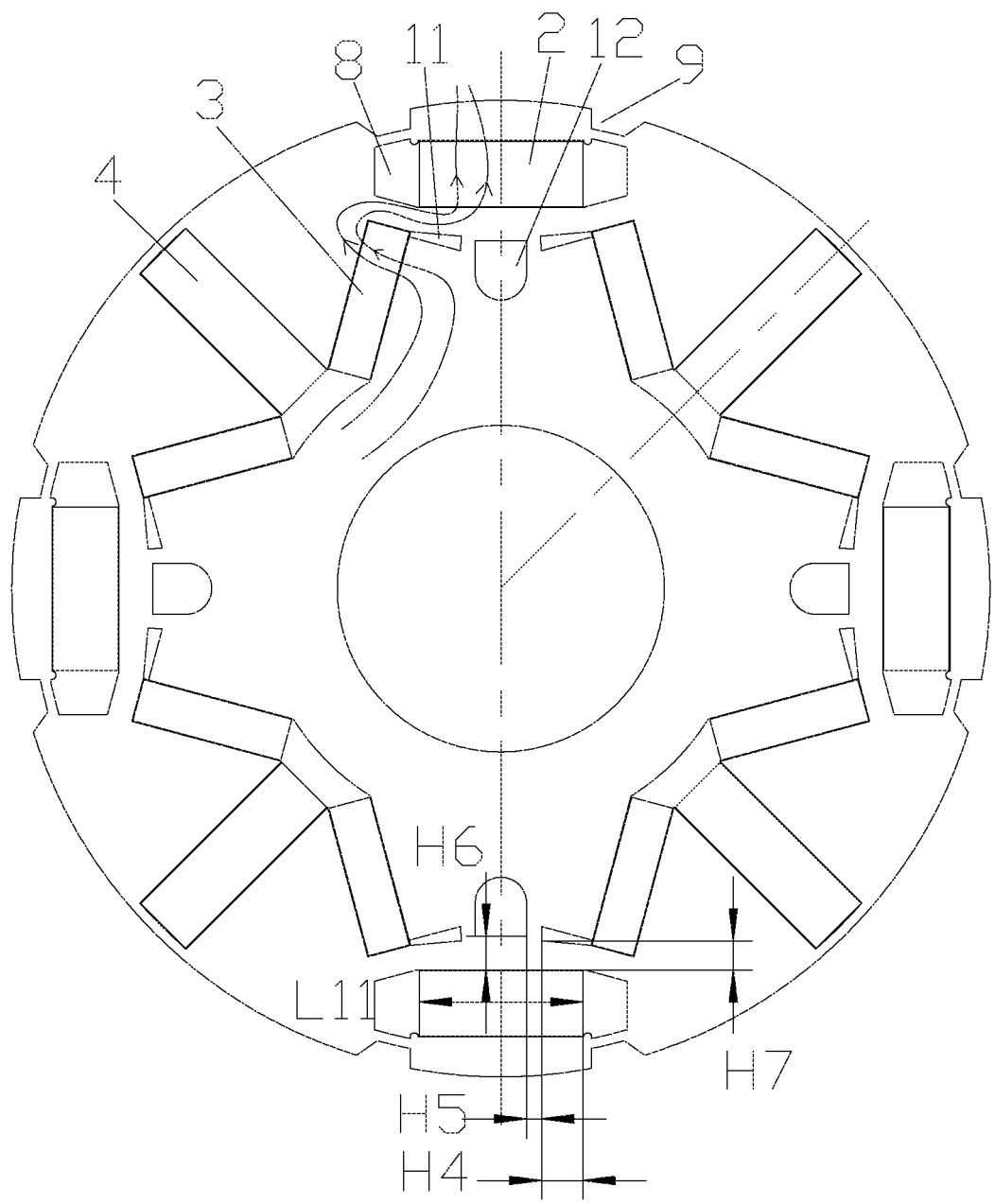
FIG. 8 is a dimensional structural view of a motor rotor according to a third embodiment of the present disclosure.
Figure 9:
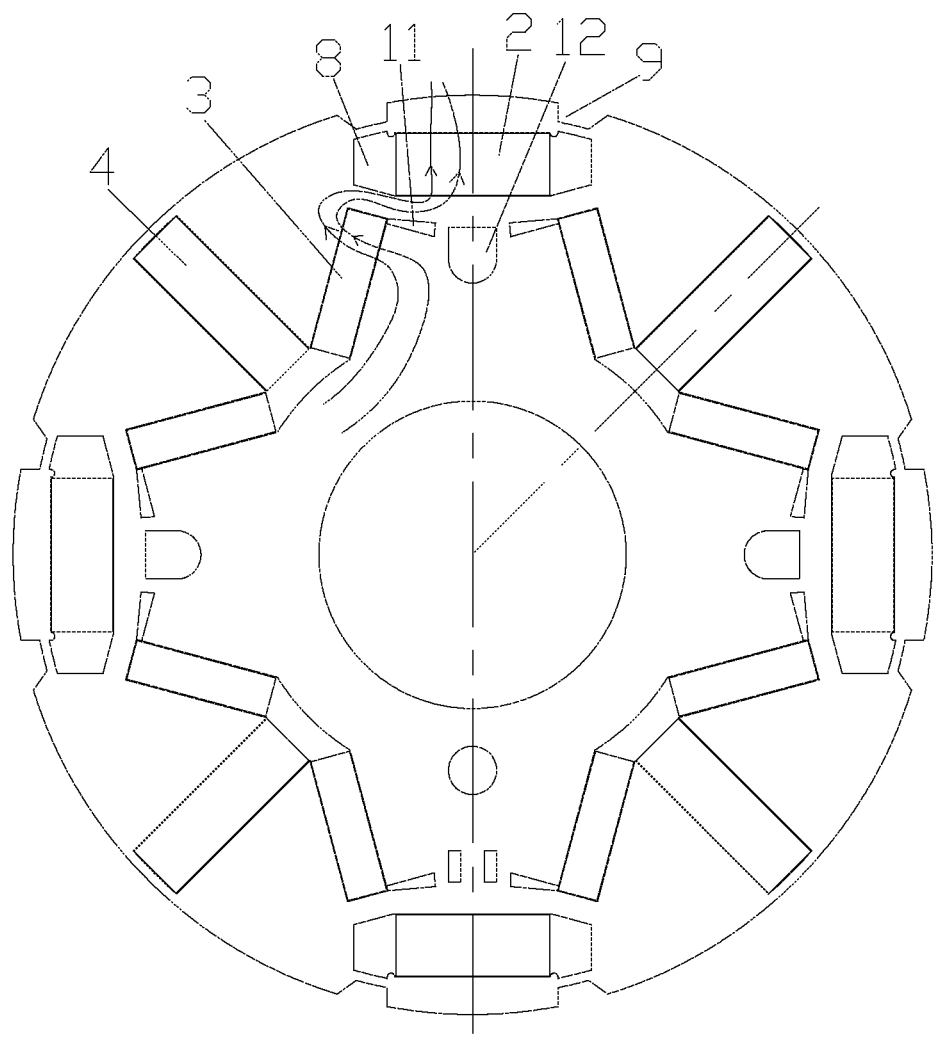
FIG. 9 is a schematic view showing a magnetic line of the motor rotor according to the third embodiment of the present disclosure.

Referring to FIGS. 8 and 9 in combination, according to a third embodiment of the present disclosure, the rotor core 1 further includes a second flux barrier slot 11 extending from an end, close to an end of the first flux barrier slot 8, of the second mounting slot 6 toward the d axis of the motor.

Preferably, the rotor core 1 further comprises a third flux barrier slot 12 and a first mounting slot 5. The first permanent magnet 2 is arranged in the first mounting slot 5, the third flux barrier slot 12 is located on the radial inner side of the first mounting slot 5 and is arranged on the d axis of the motor, and the third flux barrier slot 12 is located between the two second flux barrier slots 11. The second flux barrier slot 11 is additionally arranged at one side, close to the d axis of the motor, of the second mounting slot 6, so that the direction of the magnetic lines of the second permanent magnet can be adjusted, more magnetic lines are used for changing the magnetism of the first permanent magnet 2, and the magnetizing and demagnetizing difficulty of the motor is improved.

The third flux barrier slot 12 is arranged between the two second flux barrier slots 11, and can be used as a screw hole simultaneously. By changing its position and shape thereof, the torque pulsation of the motor during reverse magnetization can be improved effectively.

Preferably, the third flux barrier slot 12 is a U-shaped groove; alternatively, the third flux barrier slot 12 includes two rectangular grooves symmetrical about the d axis of the motor.

In the cross section of the rotor core 1, a distance between a side edge on one side, close to the third flux barrier slot 12, of the second flux barrier slot 11 and a circumferential side edge of the first permanent magnet 2 on one side where the second flux barrier slot 11 is located is H4; a distance between a side edge on one side, close to the third flux barrier slot 12, of the second flux barrier slot 11 and a side edge on one side, close to the second flux barrier slot 11, of the third flux barrier slot 12 is H5; a distance between a radial outer side edge of the third flux barrier slot 12 and a radial inner side edge of the first mounting slot 5 is H6; a distance between a radial inner side edge of the third flux barrier slot 12 and a radial inner side edge of the first mounting slot 5 is H7; a length of the first permanent magnet 2 is L11; and a width of the first permanent magnet 2 is H1; where 0.3L11≤H4≤0.4L11, L≤H5≤2L, and H7≤H6≤0.3H1.

Figure 10:
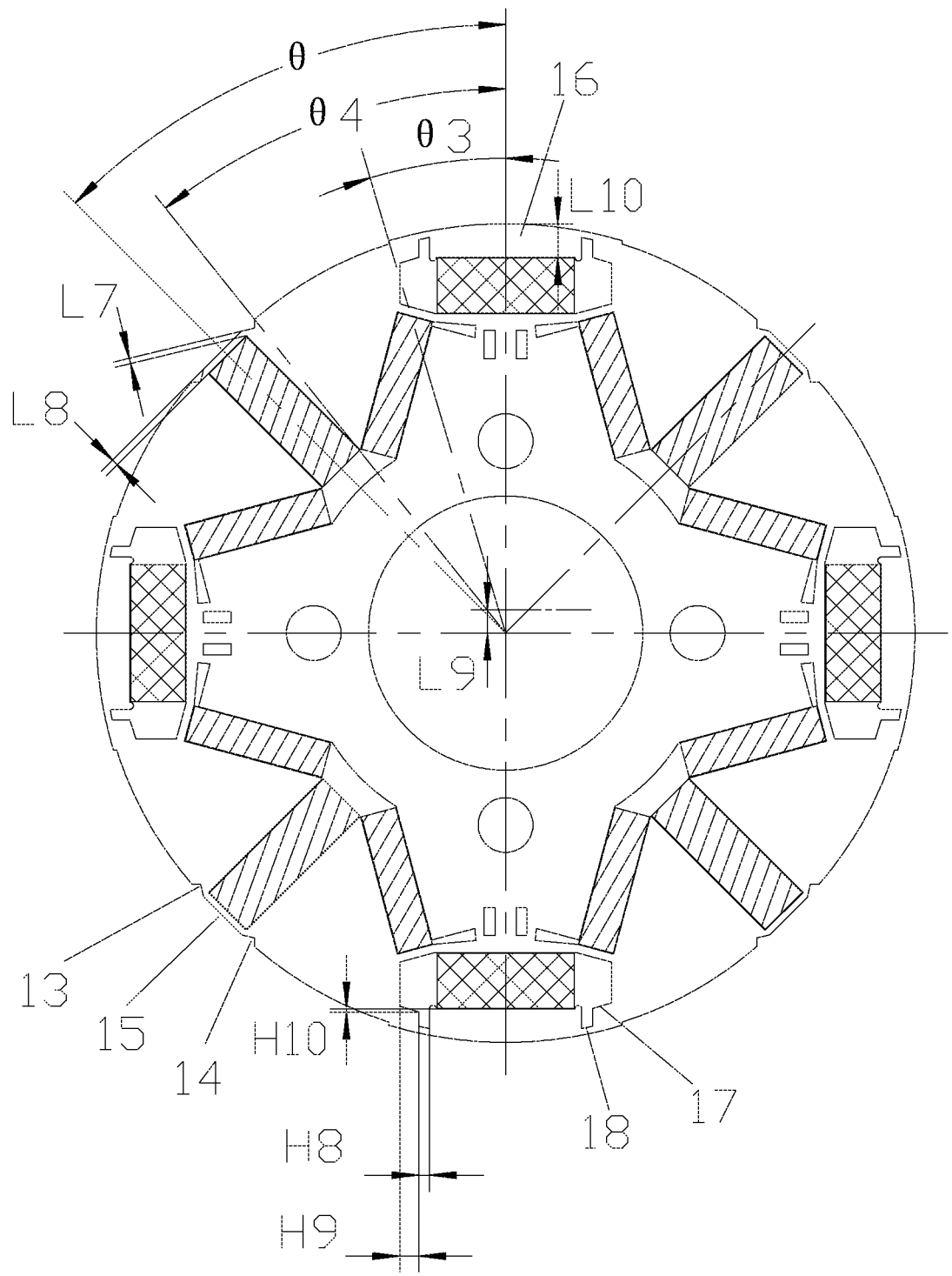
FIG. 10 is a dimensional structural view of a motor rotor according to a fourth embodiment of the present disclosure.

With reference to FIG. 10, according to a fourth embodiment of the present disclosure, a further improvement is made on the basis of the third embodiment, in which the rotor core 1 further comprises, in the cross section of the rotor core 1, a first mounting slot 5 in which the first permanent magnet 2 is mounted and a third mounting slot 7 in which the third permanent magnet 4 is mounted. The rotor core 1 comprises an eccentric section 16 eccentrically arranged relative to the center of the rotor core 1, the eccentric distance is L9, and the distance between the radial outer side edge of the first mounting slot 5 and an outer circle of the rotor is L10, where L9≤0.8L10; and/or the rotor core 1 further comprises a first V-shaped groove 13 and a second V-shaped groove 14 arranged on the outer circle of the rotor, wherein the first V-shaped groove 13 and the second V-shaped groove 14 are respectively arranged at two circumferential sides of the third mounting slot 7 and are connected through a straight cutting edge 15; a distance between a radial outer end point, close to the first V-shaped groove 13, of one side of the third mounting slot 7 and a side edge, close to the third mounting slot 7, of the first V-shaped groove 13 is L7, a distance between the straight cutting edge 15 and the radial outer side edge of the third mounting slot 7 is L8, where L8≤L7≤1.2L8; the central angle of the eccentric section 16 is 2θ3, an included angle between the connecting line connecting a vertex on one side, close to the first permanent magnet 2, of the first V-shaped groove 13 and the center of the rotor core 1 and the d axis of the motor is θ4, a mechanical angle of each magnetic pole of the motor rotor is 2θ, where 0.3θ≤θ3≤0.4θ; 0.8θ≤θ4≤0.9θ.

Through the design of the outer circle eccentricity of the rotor and the trimming design, the torque pulsation of the motor can be effectively reduced, the operating efficiency of the motor is improved, and meanwhile the q axis magnetic resistance can be further increased.

Preferably, when the rotor core 1 includes the first mounting slot 5, in the cross section of the rotor core 1, in the direction close to the d axis of the motor, and the radial outer side edge of the first flux barrier slot 8 includes a first oblique edge 17 and a first protrusion 18 connected in sequence, with the first protrusion 18 projecting outward in a direction of the d axis of the motor. A distance between the connection point of the first oblique edge 17 and the first protrusion 18 and the radial outer side edge of the first mounting slot 5 in a direction of the d axis of the motor is H10; on a straight line perpendicular to the d axis of the motor, the projection length of the first oblique edge 17 is H9; the projection length of the first protrusion 18 is H8; and a thickness of a unilateral air gap of the motor is L; where H9=2H8, and 0≤H10≤L.

Through the mode, the magnetic separation structure can be further optimized, and the efficiency of the motor is improved.

Figure 11:
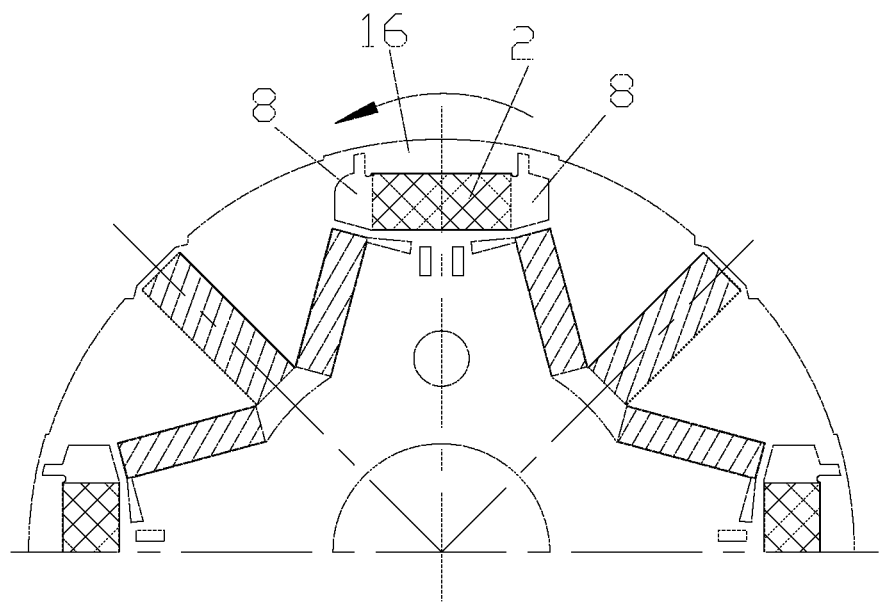
FIG. 11 is a schematic structural view of a motor rotor according to a fifth embodiment of the present disclosure.
Figure 12:
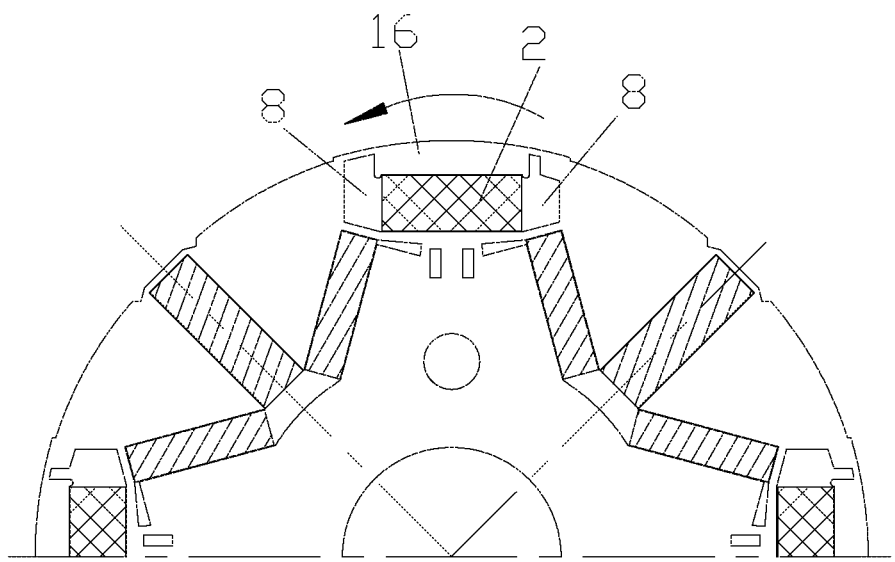
FIG. 12 is another schematic structural view of the motor rotor according to the fifth embodiment of the present disclosure.

Referring to FIGS. 11 and 12 in combination, a fifth embodiment according to the present disclosure is substantially the same as the fourth embodiment except that, in the present embodiment, two first flux barrier slots 8 at both ends of the first permanent magnet 2 are asymmetrically configured with respect to the d axis of the motor in a rotational direction of the motor rotor.

Specifically, as shown in conjunction with FIG. 11, in the present embodiment, the structure of the first flux barrier slot 8 upstream in the rotation direction of the motor rotor is the structure of the first flux barrier slot 8 in the fourth embodiment, and the structure of the first flux barrier slot 8 downstream in the rotation direction of the motor rotor is adjusted, which differs from the structure of the first flux barrier slot 8 upstream in that, in the present embodiment, the first oblique edge 17 is adjusted to be an arc-shaped edge. Therefore, the magnetic force lines can flow from one side close to the arc-shaped edge more smoothly, and the magnetic force lines flow more smoothly.

Referring to FIG. 12 in combination, it differs from FIG. 11 in that, in the present embodiment, the arc length of the radial outer side edge of the first flux barrier slot 8 located downstream in the rotation direction of the motor rotor is longer than the arc length of the radial outer side edge of the first protrusion 18 of the upstream first flux barrier slot 8, thereby forming an asymmetric structure.

By arranging the asymmetric structure, the torque pulsation during forward and reverse magnetizing can be effectively reduced, and the operating efficiency of the motor is improved.

Preferably, in each of the above embodiments, the permanent magnet is made of magnetic steel, wherein the first permanent magnet 2 having a low coercivity is made of aluminum-nickel-cobalt, samarium-cobalt, ferrite magnetic steel or the like, and the second permanent magnet 3 and the third permanent magnet 4 having a high coercivity are made of neodymium-iron-boron magnetic steel or the like.

According to an embodiment of the invention, the permanent magnet motor comprises a motor rotor, which is a motor rotor as described above.

Those skilled in the art will readily appreciate that the above-described advantageous modes may be freely combined and superimposed without conflict.

While the invention has been particularly shown and described with reference to preferred embodiments thereof, various changes, equivalents, variations and so on may be made therein without departing from the spirit and scope of the invention. The above description is only for preferred embodiments of the present disclosure, and it should be noted that several modifications and variations can be made by those skilled in the art without departing from the technical principles of the present disclosure, while these modifications and variations are considered to be within the scope of the present disclosure.

The foregoing description of the exemplary embodiments of the present disclosure has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A motor rotor, comprising a rotor core and a plurality of magnetic poles provided in the rotor core, wherein the magnetic pole comprises a first permanent magnet, a second permanent magnet and a third permanent magnet, the first permanent magnet being arranged at a central position of the magnetic pole, the second permanent magnet being arranged at two sides of the first permanent magnet, the third permanent magnet being arranged at one side, away from the first permanent magnet or the second permanent magnet, the coercivity of the first permanent magnet being lower than the coercivity of the second permanent magnet and the coercivity of the third permanent magnet, and the third permanent magnet being arranged on a q axis of the motor;

wherein both ends of the first permanent magnet are provided with a first flux barrier slot located at radial outer side of the second permanent magnet; and wherein the rotor core comprises a second mounting slot, the second permanent magnet is arranged in the second mounting slot, and a flux bridge is arranged between the first flux barrier slot and the second mounting slot; in a cross section of the rotor core, a width of the flux bridge is L5, and a thickness of a unilateral air gap of the motor is L, where L<L5.

2. The motor rotor according to claim 1, wherein the third permanent magnet is itself symmetrical about the q axis of the motor on which the third permanent magnet is located.

3. The motor rotor according to claim 1, wherein in a cross section of the rotor core, the first permanent magnet is rectangular, and the first permanent magnet is in a straight bar shape and arranged in a circumferential direction of the rotor core, the first permanent magnet being perpendicular to a d axis of the magnetic pole on which the first permanent magnet is located.

4. The motor rotor according to claim 1, wherein an outer circle of the rotor core is provided with a groove corresponding to the first flux barrier slot, and the groove corresponds to the first flux barrier slot one to one.

5. The motor rotor according to claim 4, wherein a radial depth of the groove is L1 and a thickness of a unilateral air gap of the motor is L, where 2L<L1<3L.

6. The motor rotor according to claim 4, wherein, in a cross section of the rotor core, a connecting line connecting an end point of a radial inner side edge of the first permanent magnet and a center of the rotor core is a first connecting line, and a connecting line connecting an end point on one side, close to the d axis of the motor, of a radial outer side edge of the groove and the center of the rotor core is a second connecting line, wherein an included angle between the second connecting line and the d axis of the motor is θ1, an included angle between the first connecting line and the d axis of the motor is θ2, where θ1≤θ2.

7. The motor rotor according to claim 4, wherein, in a cross section of the rotor core, a straight line perpendicular to the d axis of the motor is set as a first straight line, the groove is trapezoidal; and a projection length of a connecting line connecting two end points of the groove located at a radial outer side on the first straight line is L4, a projection length of a connecting line connecting two end points of the groove located at a radial inner side on the first straight line is L3, and a projection length of a connecting line connecting a radial inner side end point, far away from the first permanent magnet, of the first flux barrier slot and a radial outer side end point, close to the first permanent magnet, of the first flux barrier slot on the first straight line is L2, where 0.8L3≤L2<L4.

8. The motor rotor according to claim 7, wherein a width of the second permanent magnet is H2, where 0.85H2≤L2≤H2.

9. The motor rotor according to claim 4, wherein, when the rotor core comprises the first mounting slot, the radial outer side edge of the first flux barrier slot comprises a first oblique edge and a first protrusion connected in sequence in a direction close to the d axis of the motor in a cross section of the rotor core, the first protrusion protruding outwardly in a direction of the d axis of the motor, a distance between a connection point connecting the first oblique edge and the first protrusion and the radial outer side edge of the first mounting slot in a direction of the d axis of the motor being H10, on a straight line perpendicular to the d axis of the motor, a projection length of the first oblique edge being H9, a projection length of the first protrusion being H8, and a thickness of a unilateral air gap of the motor being L; where H9=2H8, and 0≤H10≤L.

10. The motor rotor according to claim 1, wherein a length of the radial inner side edge of the first flux barrier slot is L6, and a width of the second permanent magnet is H2, where 0.8H2≤L6≤1.1H2.

11. The motor rotor according to claim 1, wherein an included angle θ5 between a side edge, close to the d axis of the motor, of the second mounting slot and the d axis of the motor satisfies 12°≤θ5≤21°.

12. The motor rotor according to claim 1, wherein the rotor core further comprises a second flux barrier slot extending from an end, close to the first flux barrier slot, of the second mounting slot toward the d axis of the motor.

13. The motor rotor according to claim 12, wherein the rotor core further comprises a third flux barrier slot and a first mounting slot, the first permanent magnet being arranged in the first mounting slot, the third flux barrier slot being located on radial inner side the first mounting slot and being arranged on the d axis of the motor, wherein the third flux barrier slot is located between two second flux barrier slots.

14. The motor rotor according to claim 13, wherein, in the cross section of the rotor core, a distance between a side edge on one side, close to the third flux barrier slot, of the second flux barrier slot and a circumferential side edge of the first permanent magnet on one side where the second flux barrier slot is located is H4; a distance between a side edge on one side, close to the third flux barrier slot, of the second flux barrier slot and a side edge on one side, close to the second flux barrier slot, of the third flux barrier slot is H5; a distance between a radial outer side edge of the third flux barrier slot and a radial inner side edge of the first mounting slot is H6; a distance between a radial inner side edge of the third flux barrier slot and a radial inner side edge of the first mounting slot is H7; a length of the first permanent magnet is L11; and a width of the first permanent magnet is H1; where 0.3L11≤H4≤0.4L11, L≤H5≤2L, and H7≤H6≤0.3H1.

15. The motor rotor according to claim 13, wherein, the third flux barrier slot is a U-shaped slot; or the third flux barrier slot includes two rectangular slots which are symmetrical about the d axis of the motor.

16. The motor rotor according to claim 1, wherein, in a cross section of the rotor core, the rotor core further comprises a first mounting slot in which the first permanent magnet is mounted and a third mounting slot in which the third permanent magnet is mounted; the rotor core comprises an eccentric section eccentrically arranged relative to the center of the rotor core, an eccentric distance is L9, and a distance between a radial outer side edge of the first mounting slot and an outer circle of the rotor is L10, where L9≤0.8L10; and/or the rotor core further comprises a first V-shaped groove and a second V-shaped groove arranged on an outer circle of the rotor, wherein the first V-shaped groove and the second V-shaped groove are respectively arranged at two circumferential sides of the third mounting slot and are connected through a straight cutting edge; a distance between a radial outer end point on one side, close to the first V-shaped groove, of the third mounting slot and a side edge, close to the third mounting slot, of the first V-shaped groove being L7, and a distance between the straight cutting edge and a radial outer side edge of the third mounting slot being L8, where L8≤L7≤1.2L8; a central angle of the eccentric section being 2θ3, an included angle between a connecting line connecting a vertex on one side, close to the first permanent magnet, of the first V-shaped groove and the center of the rotor core and the d axis of the motor being θ4, and a mechanical angle of each magnetic pole of the motor rotor being 2θ; where 0.3θ≤θ3≤0.4θ, and 0.8θ≤θ4≤0.9θ.

17. The motor rotor according to claim 1, wherein two first flux barrier slots at both ends of the first permanent magnet are asymmetrically configured with respect to the d axis of the motor in a rotation direction of the motor rotor.

18. A permanent magnet motor, comprising a motor rotor, wherein the motor rotor is a motor rotor according to claim 1.

* * * * *